United States Patent
Basangova et al.

(10) Patent No.: US 12,518,328 B2
(45) Date of Patent: Jan. 6, 2026

(54) SYSTEMS AND METHODS FOR GENERATING IMAGE-BASED PROPERTY RECOMMENDATIONS AND IMPROVED GRAPHICAL USER INTERFACES

(71) Applicant: Expedia, Inc., Seattle, WA (US)

(72) Inventors: Anastasia Basangova, London (GB); Christopher William Clay Roberts, London (GB); Christian Sommeregger, London (GB); Kyle Jarvis, London (GB)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/645,285

(22) Filed: Apr. 24, 2024

(65) Prior Publication Data

US 2025/0299274 A1 Sep. 25, 2025

(30) Foreign Application Priority Data

Mar. 22, 2024 (GR) ............................... 20240100210

(51) Int. Cl.
 *G06Q 50/14* (2012.01)
 *G06N 20/00* (2019.01)

(52) U.S. Cl.
 CPC .............. *G06Q 50/14* (2013.01); *G06N 20/00* (2019.01)

(58) Field of Classification Search
 None
 See application file for complete search history.

(56) References Cited

U.S. PATENT DOCUMENTS

| | | |
|---|---|---|
| 2011/0314052 A1 | 12/2011 | Francis et al. |
| 2016/0260182 A1* | 9/2016 | Garman ................. G06Q 50/14 |
| 2017/0293851 A1* | 10/2017 | Chawla .................. G06N 5/048 |
| 2019/0164211 A1 | 5/2019 | Andrew et al. |
| 2019/0171906 A1 | 6/2019 | Sodhani et al. |
| 2022/0374646 A1* | 11/2022 | Ulammandakh ...... G06N 20/00 |
| 2023/0040513 A1* | 2/2023 | Ryan ...................... G06V 20/52 |

OTHER PUBLICATIONS

Stefanovic, "Travel Direction Recommendation Model Based on Photos of User Social Network Profile", p. 2853.
Sun et al "Building a Model-Based Personalised Recommendation Approach for Tourist Attractions from Geotagged Social Media Data", International Journal of Digital Earth, 12:6, 661-678 (2019).

* cited by examiner

Primary Examiner — George Chen
(74) Attorney, Agent, or Firm — Foley & Lardner LLP

(57) ABSTRACT

A computing system includes a processing circuit having at least one processor coupled to at least one memory device. The processing circuit performs operations including receiving, from a user device during a search session, a first visual output from a first array of visual outputs comprising a first set of configurable parameters; extracting, using a machine learning model, at least one feature of the first visual output based on a characteristic of the first visual output; identifying, using the machine learning model, one or more second visual outputs that share the at least one feature of the first visual output based on a characteristic of each of the one or more second visual outputs; generating a second array of visual outputs comprising the one or more second visual outputs; and displaying, via a user interface of the user device and during the search session, the second array of visual outputs.

16 Claims, 7 Drawing Sheets

SYSTEMS AND METHODS FOR GENERATING IMAGE-BASED PROPERTY RECOMMENDATIONS AND IMPROVED GRAPHICAL USER INTERFACES

CROSS-REFERENCE TO RELATED APPLICATION

The present application claims the benefit of and priority to Greece Patent Application No. 20240100210, filed Mar. 22, 2024, which is incorporated herein by reference in its entirety and for all purposes.

TECHNICAL FIELD

Embodiments of the present disclosure relate generally to systems and methods for generating property recommendations based on image-similarity and improved graphical user interfaces.

BACKGROUND

Conventionally, there are often several steps a user must take when searching for a travel destination or planning a trip. For example, a user often must manually search for different destinations, excursions, and travel itineraries separately to search for, plan, and schedule a trip, making it difficult to identify pertinent destinations and other information in a timely and efficient manner. In some instances, a user may desire to find a specific type of property depending on the user's individual needs and/or preferences, but may not know how to articulate those needs and preferences in a search query. Additionally, a user may not recognize whether a property meets those needs and/or preferences based on an initial property image shown to the user. As a result, increased network occupancy and processing power is required to perform numerous searches to attempt to identify the property that best suits the user's needs and preferences. Accordingly, enhanced systems and methods for increasing efficiency of travel planning and providing image-based recommendations via improved graphical user interfaces are desirable.

SUMMARY

One embodiment relates to a computing system. The computing system may include a network interface configured to communicate with a user device and at least one processing circuit coupled to the network interface, the at least one processing circuit comprising at least one processor and at least one memory, the at least one memory storing instructions therein that, when executed by the at least one processor, cause the at least one processor to: receive, from the user device during a search session, a first visual output from a first array of visual outputs, the first array of visual outputs comprising a first set of configurable parameters defined by a user; extract, using a machine learning model, at least one feature of the first visual output based on a characteristic of the first visual output; identify, using the machine learning model, one or more second visual outputs from a plurality of visual outputs stored in a database that share the at least one feature of the first visual output based on a characteristic of each of the one or more second visual outputs; generate a second array of visual outputs comprising the one or more second visual outputs; and display, via a user interface of the user device and during the search session, the second array of visual outputs, wherein the second array of visual outputs comprises at least one of the first set of configurable parameters or a second set of configurable parameters defined by the user.

Another embodiment relates to a computer-implemented method. The computer-implemented method includes: receiving, by a computing system and from a user device communicably coupled to the computing system, during a search session, a first visual output from a first array of visual outputs, the first array of visual outputs comprising a first set of configurable parameters defined by a user; extracting, by the computing system using a machine learning model stored in the computing system, at least one feature of the first visual output based on a characteristic of the first visual output; identifying, by the computing system using the machine learning model, one or more second visual outputs from a plurality of visual outputs stored in a database that share the at least one feature of the first visual output based on a characteristic of each of the one or more second visual outputs; generating, by the computing system, a second array of visual outputs comprising the one or more second visual outputs; and displaying, by the computing system via a user interface of the user device and during the search session, the second array of visual outputs, wherein the second array of visual outputs comprises at least one of the first set of configurable parameters or a second set of configurable parameters defined by the user.

Still another embodiment relates to a non-transitory computer-readable medium having instructions embodied therein that, when executed by at least one processor of a provider computing system, cause the provider computing system to perform operations. The operations include: receiving, from a user device communicably coupled to the provider computing system, during a search session, a first visual output from a first array of visual outputs, the first array of visual outputs comprising a first set of configurable parameters defined by a user; extracting, using a machine learning model, at least one feature of the first visual output based on a characteristic of the first visual output; identifying, using the machine learning model, one or more second visual outputs from a plurality of visual outputs stored in a database that share the at least one feature of the first visual output based on a characteristic of each of the one or more second visual outputs; generating a second array of visual outputs comprising the one or more second visual outputs; and displaying, via a user interface of the user device and during the search session, the second array of visual outputs, wherein the second array of visual outputs comprises at least one of the first set of configurable parameters or a second set of configurable parameters defined by the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
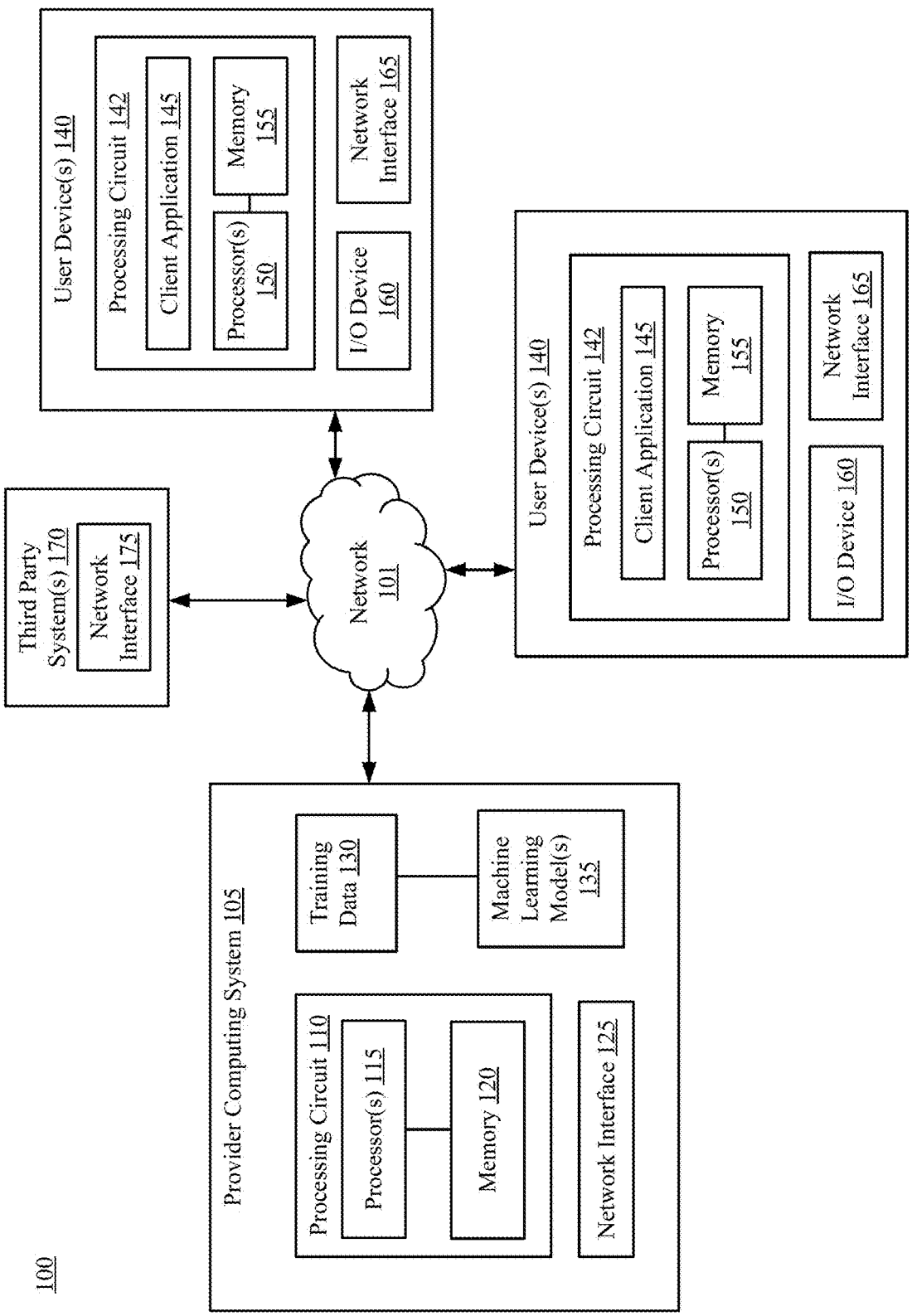
FIG. 1 depicts a block diagram of a system for generating and providing image-based recommendations and improved graphical user interfaces, according to an example embodiment.

Below are detailed descriptions of various concepts related to and implementations of techniques, approaches, methods, apparatuses, and systems for generating and providing image-based recommendations based on at least one visual output, such as at least one image output (e.g., photos or pictures, etc.), and for generating improved graphical user interfaces. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems, computer-readable media, and methods that improve conventional computers and, specifically, electronic networked search processes. The systems, computer-readable media, and methods improve electronic searches (e.g., searches for content, such as travel experiences) by generating and providing intelligent travel experience recommendation(s) and improved graphical user interfaces using various machine learning methods, according to various embodiments described herein. More specifically, the present disclosure relates to systems, apparatuses, computer-readable media, and methods for receiving a selected visual output (e.g., a property image) of a first array of visual outputs (e.g., a property image gallery), extracting at least one feature (e.g., a particular style, a feature from the image such as one or more amenities, etc.) of the selected visual output based on a characteristic (e.g., a pixel composition) of the selected visual output using at least one machine learning model, identifying one or more second visual outputs that share the at least one feature of the selected visual output based on the characteristic (e.g., the pixel composition), and generating and providing the one or more second visual outputs in a second array of visual outputs (e.g., an array of property images, a listing of properties, etc.) to a user device. The at least one feature may indicate a discerned (e.g., determined, desired, etc.) intent of the user conducting the search. In some implementations, the systems, computer-readable media, and methods described herein may generate and provide a plurality of recommendations based on the at least one extracted feature and the discerned intent associated therewith. Additionally, the systems, computer-readable media, and methods described herein may generate and provide improved graphical user interfaces displaying the plurality of recommendations, whereby the improved graphical user interfaces include a depiction of the at least one extracted feature associated with each of the plurality of recommendations. As described herein, the at least one machine learning model may be trained using one or more training data sets. For example, the at least one machine learning model may be trained to vectorize visual outputs based on the characteristic of the visual outputs, compare vectors between visual outputs, and determine similar visual outputs (e.g., property recommendations, travel experience recommendations, etc.).

Beneficially, by allowing travelers and other users to search for a travel property based on image similarity, the systems, apparatuses, computer-readable media, and methods described herein provide an efficient and interactive way to search for a property that may decrease network occupancy and reduce a time required to identify and book one or more travel properties. Typically, a user must provide a plurality of searches to identify, assess, and book a travel property. The number of searches multiplies when the user does not have a definitive idea of what type of property the user would like to book or of any particular features the user would like the property to have. Often, users will realize that they want a particular type of property or that they would like the property to include one or more specific features only upon seeing those features in a property image. For example, the user may see a photo of a property with a particular style and would like to book a property with that particular style but does not know exactly how to search for a property with that particular style. It can be difficult to textually describe desired properties and/or features, requiring even more searches before the user finds those desired properties and/or features among a set of search results. In turn, the user spends significant amounts of time performing internet searches trying to identify properties with that particular style, which occupies bandwidth and processing power all while occupying the user's time. Additionally, when a user is searching for properties, the search results may not provide images of the desired features, which then requires the user to navigate through a property image gallery before finding an image that depicts the desired features. This navigation through the property image gallery, rather than finding the desired features in an image on a search results page, consumes the user's time, occupies bandwidth and processing power, and is associated with inefficient searching.

The systems, apparatuses, computer-readable media, and methods described herein provide a technical solution to at least the technical problem of excessive and/or unfocused searches by analyzing a selected visual output, identifying one or more visual outputs with similar features as the selected visual output, and generating one or more recommendations based on the identification. In this regard, a non-conventional atypical search system, method, and apparatus is provided. In operation, the number of searches may decrease, which may result in drastically improved time savings as well as bandwidth savings. The systems, computer-readable media, and methods described herein may leverage outputs of the at least one machine learning model to reduce the amount of inputs necessary to identify an ideal travel experience, thereby reducing an amount of time it takes to plan a trip while increasing processing power of a computing system. Additionally, using a characteristic-based image analysis, the systems, computer-readable media, and methods described herein are configured to conduct a property search based on visual features and/or discerned intents of a user that are otherwise difficult to articulate using conventional search parameters.

The systems, computer-readable media, and methods described herein are further configured to generate graphical user interfaces that depict the visual features and/or discerned intents associated with each of the search results. Search results often include default images (e.g., hero images, etc.) associated with each of the search results. For example, the default image associated with one travel property may depict a pool at the property, the default image associated with a second travel property may depict a façade of the property, the default image associated with a third travel property may depict a restaurant at the property, and so on. When a user is searching for properties that include a particular feature and/or relate to a discerned intent, however, the user has no way to visually compare that particular feature among the search results without clicking on each of the individual results and navigating through an image gallery associated with each of the results in order to identify the particular feature. For example, if a user is searching for properties with a family-friendly pool, then the user is interested in seeing images of a pool included at the property and may not be interested in seeing images of a restaurant, a façade, a sample room, and so on. Therefore, systems, computer-readable media, and methods that replace default images on a set of search results with images that depict a particular feature and/or discerned intent around which the search is based will improve searching efficiency by reducing a number of clicks required to identify relevant features, improve processing power, reduce bandwidth required for searching, and consume less of a user's time. These and other features and benefits are described more fully herein below.

Before turning to the Figures, which illustrate certain example embodiments in detail, it should be understood that the present disclosure is not limited to the details or methodology set forth in the description or illustrated in the Figures. It should also be understood that the terminology used herein is for the purpose of description only and should not be regarded as limiting.

FIG. 1 illustrates an example system 100 for generating and providing image-based recommendations and improved graphical user interfaces, according to an example embodiment.

In some implementations, various components and/or systems of the system 100 may be configured to generate and provide image-based recommendations associated with traveling and/or trip planning (e.g., hotels, resorts, rental properties, etc.).

The system 100 includes a provider computing system 105 coupled to one or more user devices 140 and one or more third-party systems 170 via a network 101. The provider computing system 105 may be a computing system associated with a provider entity. The provider organization or entity may be a provider of goods and/or services. In this example, the provider entity is a travel services/experiences provider, such as a travel agency, that provides and maintains one or more accounts on behalf of the user. The provider may be a transportation provider (e.g., airline, car service, etc.), a lodging provider (e.g., hotel, rental property, cruise, etc.), an experience provider (e.g., theme parks, concerts, shows, events, excursions, etc.), or any combination thereof. In the example shown, the provider is a travel or experience booking agency that provides or enables a variety of experiences by interfacing/communicating with other providers (e.g., lodging providers, airline providers, etc.).

The provider computing system 105 is structured as one or more backend computing systems comprising one or more servers and other computing components. The provider computing system 105 can store predetermined training data 130. The predetermined training data 130 may include one or more of image data, caption data, travel metadata, or user account data. The provider computing system 105 includes one or more machine learning models 135 that can be trained using the training data 130, as described in greater detail herein. Although shown as internal to the provider computing system 105, it should be understood that the training data 130 may be stored external to the provider computing system 105, for example, as part of a cloud computing system or an external storage medium in communication with the provider computing system 105 via the network 101.

Each component (e.g., the provider computing system 105, the network 101, the machine learning model 135, the user devices 140, the third-party systems 170, etc.) of the system 100 can be implemented using the hardware components or a combination of software with the hardware components of any computing system described herein. Each component of the system 100 can perform one or more of the functionalities detailed herein.

The provider computing system 105 can include at least one processing circuit 110, which may, as an example, include at least one processor 115 and at least one memory 120. The provider computing system 105 may include one or more servers that include one or more of the processors and/or memory components described above and herein. The memory 120 can store computer-executable instructions that, when executed by the processor 115, cause the processor 115 to perform one or more of the operations described herein. The processor 115 may include a microprocessor, an application-specific integrated circuit (ASIC), a field-programmable gate array (FPGA), a graphics processing unit (GPU), a tensor processing unit (TPU), etc., and/or combinations thereof. The memory 120 may include, but is not limited to, electronic, optical, magnetic, or any other storage or transmission device capable of providing the processor with program instructions. The memory 120 may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The provider computing system 105 can include one or more computing devices or servers that can perform various of the operations or functions described herein.

The provider computing system 105 can include a network interface 125. In some instances, the network interface 125 includes, for example, program logic and any associated hardware components (e.g., transceivers, ethernet cards, etc.) that connects the provider computing system 105 to the network 101. The network interface 125 facilitates secure communications between the provider computing system 105 and each of the user device(s) 140 and third party system(s) 170. The network interface 125 also facilitates communication with other entities, such as other providers of goods and/or services. The network interface 125 further includes user interface program logic configured to generate and present web pages to users accessing the institution computing system 105 over the network 101.

The network 101 can include packet-switching computer networks such as the Internet, local, wide, metro, or other area networks, intranets, satellite networks, other computer networks such as voice or data mobile phone communication networks, or combinations thereof. The provider computing system 105 of the system 100 can communicate via the network 101 with one or more computing devices, such as the one or more user devices 140 and the one or more third-party systems 170. The network 101 may be any form of computer network that can relay information between the provider computing system 105, the one or more user devices 140, the one or more third-party systems 170, and one or more information sources, such as web servers or external databases, amongst others. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may include any number of hardwired or wireless connections. Any or all of the computing devices described herein (e.g., the provider computing system 105, the one or more user devices 140, the one or more third-party systems 170, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein (e.g., the provider computing system 105, the one or more user devices 140, the one or more third-party systems 170, etc.) may also communicate wirelessly with the computing devices of the network 101 via a proxy device (e.g., a router, network switch, or gateway). In some embodiments, a wired or a combination of wired and/or wireless connections may be used to enable communicable coupling.

The system 100 is shown to include a plurality of user devices 140. The user device 140 may be owned by, managed by, and/or otherwise associated with a user. As the provider is a travel experience provider, in this example, the user may be a traveler or a person who books experiences on behalf of a traveler/user. The user device 140 can include one or more computing devices that can perform various operations as described herein. For example, in some implementations, the user device 140 may be or may include, for example, a desktop or laptop computer (e.g., a tablet computer), a smartphone, a wearable device (e.g., a smartwatch), a personal digital assistant, and/or any other suitable computing device. In the example shown, the user device 140 is structured as a mobile computing device, namely a smartphone.

Each of the user devices 140 can include at least one processing circuit 142, which may, as an example, include at least one client application (e.g., client application 145), at least one processor (e.g., processor(s) 150), and at least one memory (e.g., memory 155). In some implementations, one or more of the user devices 140 can access various functions of the provider computing system 105 through the network 101. For example, the user device 140 can access one or more functions of the provider computing system 105 via the client application 145 of the user device 140 that is configured to display various user interfaces to the user device 140 via the network 101. As described in greater detail herein, a user of the user device 140 can select one or more visual outputs within the client application 145 of the user device 140 (e.g., via one or more outputs to a user interface of the user device 140). The provider computing system 105 can determine, using the one or more trained machine learning models 135, an output based on the one or more of various selected visual output and render responses on the user device 140 via the client application 145.

The client application 145 can be coupled to and supported, at least partly, by the provider computing system 105. For example, in operation, the client application 145 can be communicably coupled to the provider computing system 105 and may perform certain operations described herein, such as receiving one or more visual inputs and generating one or more user interfaces including one or more recommendations associated with the one or more visual inputs that is displayed on the user device 140. In some embodiments, the client application 145 includes program logic stored in a system memory (e.g., memory 155) of the user device 140. In such arrangements, the program logic may configure a processor (e.g., processor(s) 150) of the user device 140 to perform at least some of the functions discussed herein with respect to the client application 145 of the user device 140. In the example shown, the client application 145 may be downloaded from an application store, stored in the memory 155 of the user device 140, and selectively executed by the processor(s) 150. In other embodiments, the client application 145 may be hard-coded into the user device 140. In still various other embodiments, the client application 145 is a web-based application. As alluded to above, the client application 145 may be provided by the provider associated with the provider computing system 105 such that the client application 145 supports at least some of the functionalities and operations described herein with respect to the provider computing system 105. In this way, the client application 145 may also be referred to as a provider institution client application or provider client application. In some embodiments, the client application 145 may be accessed and executed by the processor(s) 150 responsive to receiving various credentials of a user to access the client application 145 (e.g., a username, a password, a pin code, a biometric such as a facial scan or a fingerprint, a combination thereof, etc.).

In some instances, the client application 145 may additionally be coupled to the third party system(s) 170 (e.g., via one or more application programming interfaces (APIs) and/or software development kits (SDKs)) to integrate one or more features or services provided by the third party system(s) 170. In some instances, the third party system(s) 170 may alternatively and/or additionally provide services via a separate client application 145.

The processor(s) 150 can include a microprocessor, an ASIC, an FPGA, a GPU, a TPU, etc., or combinations thereof. The memory 155 can store processor-executable instructions that, when executed by the processor(s) 150, cause the processor(s) 150 to perform one or more of the operations described herein. The memory 155 can include, but is not limited to, electronic, optical, magnetic, or any other storage or transmission device capable of providing the processor with program instructions. The memory 155 can further include a memory chip, ROM, RAM, EEPROM, EPROM, flash memory, optical media, or any other suitable memory from which the processor(s) 150 can read instructions. The instructions can include code from any suitable computer programming language.

The user device 140 is further shown as including an I/O device 160 and a network interface 165. The I/O device 160 can include various components for receiving inputs, providing outputs, or receiving and providing inputs and outputs, respectively, to a user of the user device 140. For example, the I/O device 160 can include a display screen such as a touchscreen, a mouse, a button, a keyboard, a microphone, a speaker, an accelerometer, actuators (e.g., vibration motors), any combination thereof, etc. The I/O device 160 may also include circuitry/programming/etc. for operating such components. The I/O device 160 thereby enables communications to and from a user, for example communications relating to travel recommendations as described in further detail herein.

The network interface 165 includes, for example, program logic and various devices and/or components and systems (e.g., transceivers, etc.) that connect the user device 140 to the network 101. The network interface 165 facilitates secure communications between the user device 140 and each of the provider computing system 105 and/or the third party system 170. The network interface 165 also facilitates communication with other entities, such as other providers of goods and/or services.

The system 100 is shown to include the third-party system 170 (although only one is shown, there could be a plurality). The third party system or third party computing system 170 may be a third party relative to the provider, and be associated with a third party entity. For example, the third party entity may be or may include various goods and/or services provider entities including, but not limited to, a transportation provider (e.g., airline, car service, etc.), a lodging provider (e.g., hotel, rental property, cruise, etc.), an experience provider (e.g., theme parks, concerts, shows, events, excursions, etc.), or any combination thereof. The provider computing system 105 may communicate with the third-party computing system 170 to make bookings and reserve experiences on behalf of the traveler/user. The third party computing system 170 includes a respective network interface 175 to facilitate exchanging data with the provider computing system 105 and/or the user device 140 through the network 101. The third party computing system 170 may include one or more servers. The third party computing system 170 may include one or more APIs and/or SDKs associated with the third party entity for exchanging data with the provider computing system 105 and/or the user device 140, as described herein.

Figure 2:
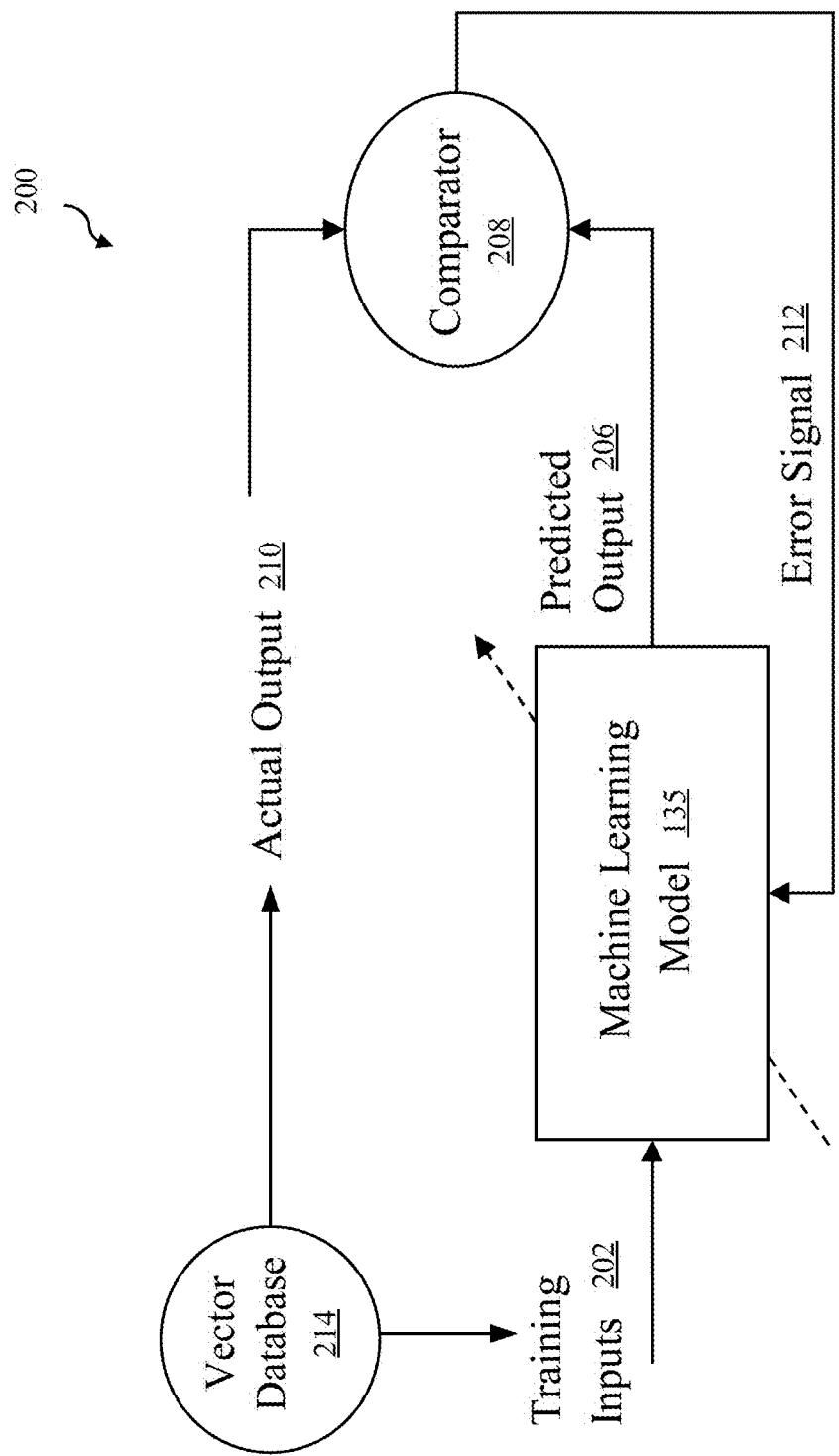
FIG. 2 depicts a block diagram of an artificial intelligence (AI) sub-system of FIG. 1, according to an example embodiment.
Figure 3:
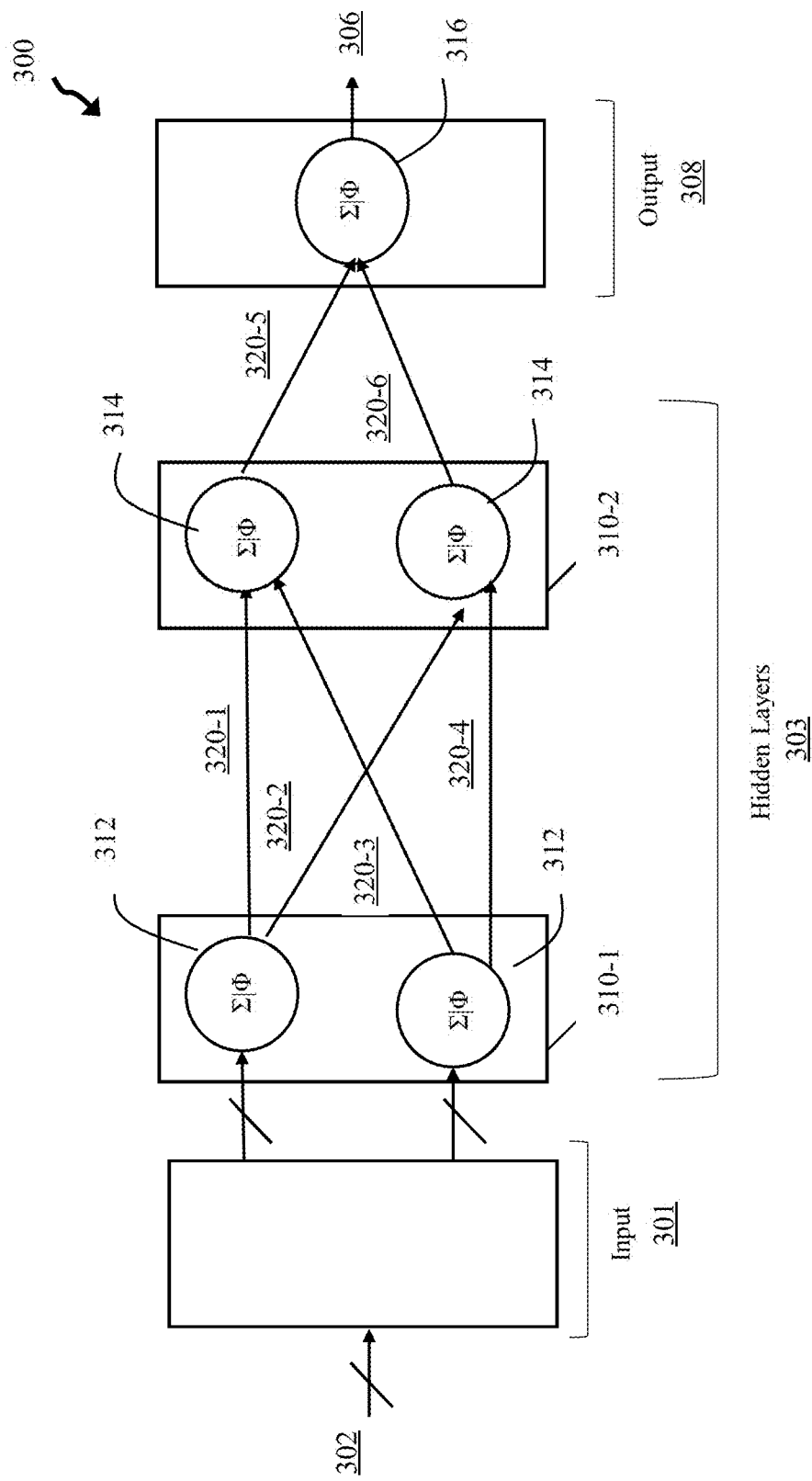
FIG. 3 depicts a block diagram of an AI model of the AI sub-system of FIG. 1, according to an example embodiment.

The machine learning model 135 may be structured to recognize patterns, trends, and the like in data and make one or more determinations. For example, FIGS. 2 and 3 represent example structures of the machine learning model 135. With reference to FIG. 2, a block diagram of an example system 200 using supervised machine learning is shown. Supervised learning is a method of training a machine learning model (e.g., machine learning model 135) given input-output pairs (e.g., stored in the training data 130). An input-output pair is an input with an associated known output (e.g., an expected output). The machine learning model 135 may be trained on known input-output pairs (e.g., the training data 130) such that the machine learning model 135 can learn how to predict known outputs given known inputs. Once the machine learning model 135 has learned how to predict known input-output pairs, the machine learning model 135 can operate on unknown inputs to predict an output.

The machine learning model 135 may be trained based on general data and/or granular data (e.g., data based on a specific user) such that the machine learning model 135 may be trained specific to a particular user. Training inputs 202 and actual outputs 210 may be provided to the machine learning model 135. For example, as described in greater detail herein, training inputs 202 may include images and/or other medias, captions to describe the images, metadata, user account data, and/or other data stored in the provider computing system 105. Actual outputs 210 may include captions, traveler data, and/or property data. The training inputs 202 and the actual outputs 210 may be received from the training data 130. For example, the training data 130 may contain various datasets including the images and/or other medias, captions, metadata, traveler data, property data, etc., as described herein. Thus, the machine learning model 135 may be trained to predict recommended properties based on the training inputs 202 and actual outputs 210 used to train the machine learning model 135.

In some embodiments, the training inputs 202 and the actual outputs 210 may first enter a vector database 214 of the system 200 before the training inputs 202 are provided to the machine learning model 135. The vector database 214 is configured to parse the training inputs 202 and the actual outputs 210 to identify a characteristic of one or more visual features (e.g., visual features shown in images and/or other media, such as a picture of a pool or other feature in the image(s)) from the training inputs 202 and the actual outputs 210. In some embodiments, the characteristic may be identified by a pixel composition (e.g., a placement of pixels, a location of pixels, a number of pixels, etc.) of an image. The characteristic may then be converted to one or more corresponding vectors that represent each of the features identified from the training inputs 202 and the actual outputs 210. The one or more corresponding vectors are stored in the vector database 214.

In operation, the machine learning model 135 may use various training inputs 202 (e.g., images, captions, metadata, traveler data, property data, etc.) to determine and, particularly, predict various outputs 206 (e.g., property recommendations), by applying the current state of the machine learning model 135 to the training inputs 202. The comparator 208 may compare the predicted outputs 206 to actual outputs 210 to determine an amount of error or differences. For example, the predicted, determined, and/or generated property recommendations (predicted output 206) may be compared to the actual property data stored in the provider computing system 105 (actual output 210). In other words, the actual outputs 210 may be based on historical data of recommended properties made to a user of the user device 140 and stored in the training data 130. In an illustrative non-limiting example, training inputs 202 may include an image of a property (e.g., a hotel bar, a resort pool, a kitchen space, etc.), a caption of the image (e.g., "Sleek and Modern Hotel Bar," "Family-Friendly Beach-Front Pool," "Spacious Kitchen with Family Dining Table," etc.), metadata associated with the property (e.g., historical prices, property reviews, included amenities, required duration of stay, etc.), and/or historical traveler data associated with the property (e.g., a user books a business trip, a user books a vacation with kids, a user books a reunion, etc.). The actual outputs 210 may include properties a user booked previously (e.g., booked a hotel with a modern bar, booked a resort with a waterpark, booked a rental house with a large kitchen, etc.). The machine learning model 135 may be trained based on the known training inputs 202 to identify one or more properties (e.g., based on one or more vectors stored in the vector database 214) to determine an output based on a selected image.

During training, the error (represented by error signal 212) determined by the comparator 208 may be used to adjust the weights in the machine learning model 135 such that the machine learning model 135 changes (or learns) over time. The machine learning model 135 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine learning model 135 such that the algorithmic weights adapt based on the amount of error. The error is minimized using a loss function. Non-limiting examples of loss functions may include the square error function, the root mean square error function, and/or the cross-entropy error function.

The weighting coefficients of the machine learning model 135 may be tuned to reduce the amount of error, thereby minimizing the differences between (or otherwise converging) the predicted output 206 and the actual output 210. The machine learning model 135 may be trained until the error determined at the comparator 208 is within a certain threshold (or a threshold number of batches, epochs, or iterations have been reached). The trained machine learning model 135 and associated weighting coefficients may subsequently be stored in memory or other data repository (e.g., a database) such that the machine learning model 135 may be employed on unknown data (e.g., not training inputs 202). Once trained and validated, the machine learning model 135 may be employed during a testing (or an inference phase). During testing, the machine learning model 135 may ingest unknown data to predict future data.

With reference to FIG. 3, a block diagram of a simplified neural network model 300 is shown, according to an example embodiment. The neural network model 300 may include a stack of distinct layers (vertically oriented) that transform a variable number of inputs 302 being ingested by an input layer 301, into an output 306 at the output layer 308.

The neural network model 300 may include a number of hidden layers 310 between the input layer 301 and output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sums up the values from adjacent nodes and applies an activation function, allowing the neural network model 300 to detect nonlinear patterns in the inputs 302. Each of the nodes (312, 314 and 316) is interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306.

In some embodiments, the output 306 may be one or more numbers. For example, output 306 may be a vector of real numbers subsequently classified by various one or more of any classifiers. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

It is noted that various other forms of classifiers may be implemented or used in the present disclosure (e.g., in the machine learning model 135). For example, the machine learning model 135 described herein may include or use a support vector machine, random forest, K-nearest neighbors, naïve bayes, or any other type or form of classifier.

Figure 4:
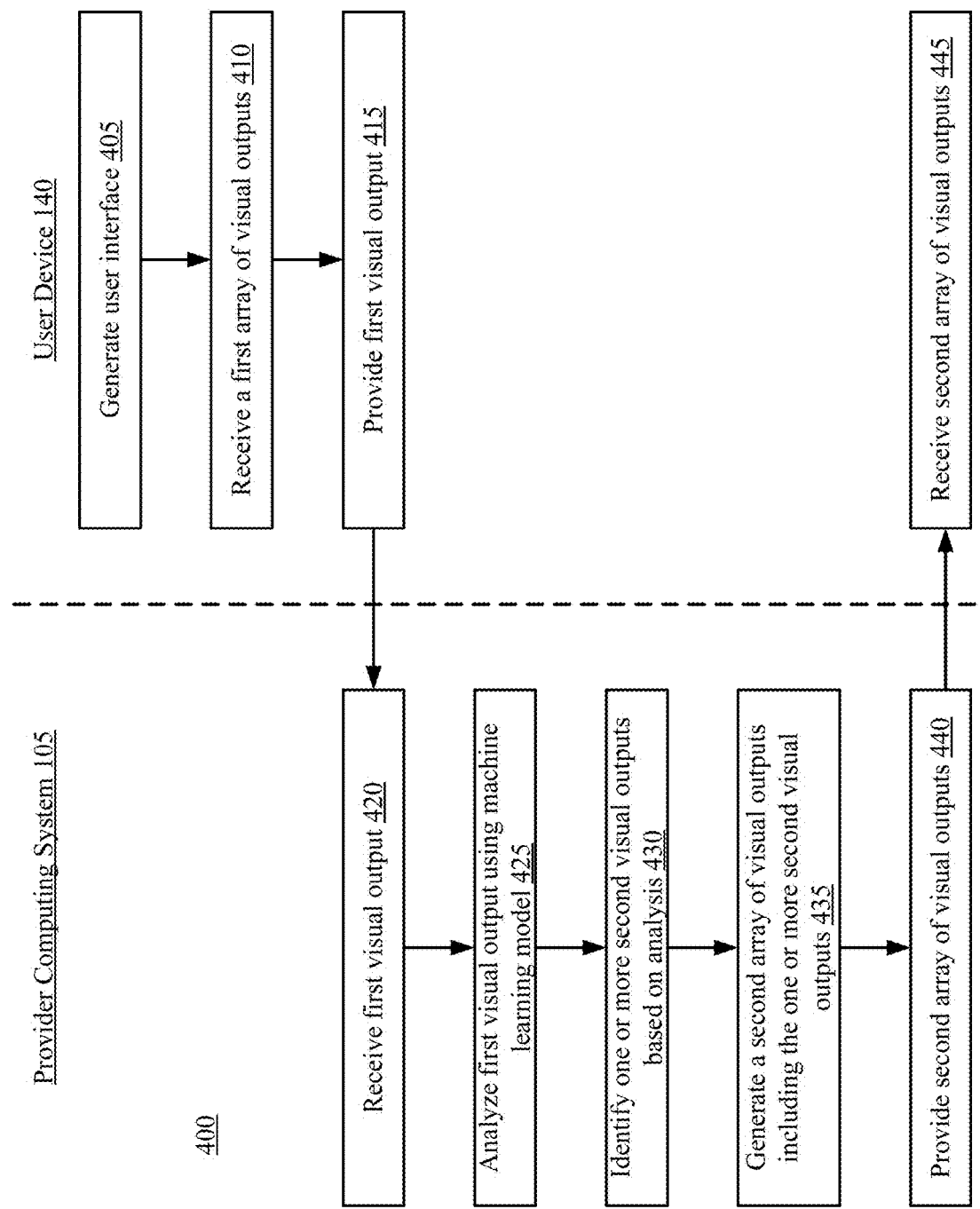
FIG. 4 depicts a method of generating and providing image-based recommendations, according to an example embodiment.

Based on the foregoing, referring now to FIG. 4, a flowchart of a method 400 of generating and providing at least one travel experience recommendation based on image similarity using the machine learning model(s) 135 is shown, in accordance with one or more implementations.

Although the operations of the method 400 are described as being performed by various portions of the system 100 (e.g., the provider computing system 105, the user device 140, and/or the third-party system 170), it should be understood that the method 400 may be executed using any suitable computing system (e.g., the provider computing system 105 of FIG. 1, the user device 140 of FIG. 1, the third-party system 170 of FIG. 1, etc.). It may be appreciated that certain steps of the method 400 may be executed in parallel (e.g., concurrently) or sequentially. It may also be appreciated that while certain acts of the method 400 are shown as being performed by a specific device, some acts may be performed by another device of the system 100 in FIG. 1.

Although not shown in FIG. 4, the method 400 may begin when a user accesses the client application 145 (e.g., via the user device 140). The user may log into the client application 145 by submitting one or more credentials (e.g., a username, a password, a pin code, a biometric such as a facial scan or a fingerprint, a combination thereof, etc.). Upon receiving the one or more credentials via the user device 140, the provider computing system 105 may be configured to grant the user access to the client application 145. By associating the user with the account using the one or more credentials, the provider entity may be configured to retrieve account information (e.g., personal information, past travel history, etc.) and personalize the travel experience recommendations based on the unique account information associated with the user. Once the user receives access to the client application 145, the user may submit a search query for one or more travel experiences. Alternatively or additionally, the user may submit the search query upon accessing a website operated by the provider entity (e.g., by typing in a domain name associated with the website, clicking a hyperlink to the domain name, etc.) through any established communications protocol and not log-in. In this latter embodiment, traveler-specific information (e.g., that may be stored by the provider in an account associated with the traveler) may not be utilized or utilized later to generate personalized travel recommendations.

The method 400 may include act, operation, or process 405 in which the user device 140 generates and provides a user interface via I/O device 160. The user device 140 may generate the user interface in response to the user successfully logging into the client application 145. In some embodiments, the user interface may include a search field in which the user may be configured to enter a search query and initiate a search session. The search session refers to a user interaction with the provider entity during which the user receives one or more travel experience recommendations from the provider entity in response to the search query or multiple search queries entered/provided by the user.

In some embodiments, the search query includes a first set of configurable parameters defined by the user. The first set of configurable parameters refer to parameters associated with the travel search including, but not limited to, a party size, a geographical region of interest, a property-type of interest (e.g., hotel, motel, all-inclusive resort, etc.), a timeframe of a trip, a price range associated with one or more aspects of a trip (e.g., an airline price, a lodging price, an overall total price, etc.), one or more amenity offerings, and so on. The party size refers to a number of travelers included in a trip associated with the user's search query. For example, if the user is searching for a travel property via the client application 145, the user may indicate that two adults and four children will be going on the trip. The geographical region refers to a location to which the user is traveling. For example, the geographical region may include a country (e.g., England), a state (e.g., Florida), a city (e.g., London), a neighborhood (e.g., Covent Garden), etc. The user may indicate a radius (e.g., 5 miles, 10 miles, 25 miles, 100 miles, etc.) surrounding the geographical region to which the user may be willing to extend the search query. For example, if a user specifies a search for travel properties in Covent Garden using one of the configurable parameters, the user may further specify that the results may extend to a 5-mile radius surrounding the Covent Garden neighborhood. In some embodiments, the user may choose to omit a geographical region in the initial search query, in which case the search results are not bound to any geographical restraint. The property type refers to a type of property for which the user is searching. For example, the user may indicate that they are searching for an all-inclusive resort, a hotel room, a rental home, a motel, a condominium, a hostel, etc. The timeframe refers to a duration of time during which the user will be traveling. For example, the user may indicate a specific date range (e.g., March 4 through March 7), a week (e.g., first week in February), a month (e.g., March), a season (e.g., summer), a calendar year (e.g., 2025), and so on. The price range refers to a preferred range that the user is willing to pay for a travel experience. For example, the price range may include a cost per night (e.g., $200-$400 per night), a total cost for the trip (e.g., $1,000-$2000 for two people for five nights), a price per person (e.g., $500-$1,000 per person), a price per person per night ($100-$400 per person per night), and so on. The one or more amenity offerings refers to one or more specific features and/or discerned intents that the user desires to find in a travel experience. For example, the one or more amenity offerings may include a fitness center, a pool, a waterpark, beach access, tennis courts, parking, and so on.

In response to the search query, the provider computing system 105 may present one or more results to the user via the user interface. The one or more results may include a list (e.g., a textual list, an array of images, etc.) of travel experiences that meet one or more criteria defined by the configurable parameters included in the search query. The one or more criteria may include the party size, the geographical region, the property-type, the timeframe, the price range, the one or more amenity offerings, and so on. In some embodiments, the provider computing system 105 identifies the one or more results by identifying one or more travel experiences stored in a database of the provider computing system 105 that are tagged with one or more features corresponding to the criteria indicated by the configurable parameters in the search query. The provider computing system 105 may, for each of the travel experiences stored in the database of the provider computing system 105, associate one or more data tags (e.g., a label, an identifier, metadata, etc.) with the travel experience. The one or more data tags represent a feature, element, detail, or other piece of information corresponding to the travel experience. For example, for an all-inclusive resort in Orlando, the provider computing system 105 may associate a data tag representing the property type as resort, the location as Orlando, one or more amenities as an all-inclusive package, and so on. Then, when the provider computing system 105 receives one or more criteria defined by the configurable parameters of a search query (e.g., "provide me with all-inclusive resort options in Orlando"), the provider computing system 105 can identify one or more travel experiences stored in that database that have data tags corresponding to the one or more criteria. For example, is a search query requests beach-front hotels in Miami, the provider computing system 105 may identify one or more travel experiences stored in the database that have data tags indicating a location in Miami, a beach-front property, and a property-type of hotel. The provider computing system 105 will then present these travel experiences as the one or more results via the user interface.

From the one or more results, the user may select (e.g., via the I/O device 160 of the user device 140) one travel experience from the list of travel experiences. In some embodiments, upon receiving the selection of the one travel experience, the method 400 may include act, operation, or process 410, in which the user device 140 (e.g., via the one or more processor(s) 150) receives a first array of visual outputs from the provider computing system 105. The first array of visual outputs may refer to an image gallery associated with the one travel experience selected from the results of the search query. The image gallery may include a plurality of images associated with the selected travel experience. In some embodiments, each of the images may depict a particular feature (e.g., a pool, a bar, a restaurant, a scenic view, etc.) and/or discerned intent (e.g., a family-friendly atmosphere, a modern bar, etc.) of the selected travel experience. In some embodiments, the user device 140 may receive the first array of visual outputs via any of user interfaces 600a or 600c, as described in greater detail below with references to FIGS. 6A and 6C, respectively.

For example, a user may submit a search query for resort properties in Orlando that accommodate six travelers (i.e., a search query with one or more configurable parameters indicating a geographical location and a party size). In this example, the user may use the configurable parameters to indicate a property-type of a resort, a geographical region of Orlando, and a party size of six. In response to the search query, the provider computing system 105 may identify a plurality of resort properties in Orlando that accommodate six travelers and may generate and provide a display including the plurality of resort properties on a user interface (e.g., of the client application 145). The user may select one resort property (i.e., a property image from a plurality of images) of the plurality of resort properties by engaging with the user interface via the I/O device 160 of the user device 140. After the user selects the resort property (i.e., an image from an array of images associated with the search query), the user may receive an image gallery associated with the selected resort property (e.g., the first array of visual outputs received via the user device 140 during the process 410, as described above).

The method 400 may include act, operation, or process 415, in which a user of the user device 140 (e.g., via the one or more processor(s) 150) selects a visual output from the first array of visual outputs and the user device 140 provides the selected visual output to the provider computing system 105. In one embodiment, the user may select the visual output via the client application 145. In another embodiment, the provider computing system 105 generates one or more user interfaces to receive the selected visual output and provides the one or more user interfaces to the user device 140 over the network 101. In these implementations, the provider computing system 105 may be continuously communicating with the user device 140 over the network to receive the selected visual output via the user device 140.

Responsive to receiving the selected visual output, the user device 140 may be configured to transmit the selected visual output to the provider computing system 105 over the network 101. In these implementations, the user device 140 may transmit the selected visual output to the provider computing system 105 for processing only after receiving the selected visual output (e.g., as opposed to continuous data transfer between the user device 140 and the provider computing system 105). This enables less network occupancy until only after the selected visual output has been received and/or uploaded instead of continuous network occupancy, which can increase processing power of the provider computing system 105 and reduce end-to-end latency between the provider computing system 105 and the user device 140.

The method 400 may include act, operation, or process 420, in which the provider computing system 105 receives the selected visual output via the user device 140 (e.g., over the network 101). The method 400 may include act, operation, or process 425, in which the provider computing system 105 (e.g., via the one or more processor(s) 115) provides the selected visual output to the machine learning model 135 and analyzes the selected visual output.

In one embodiment, the machine learning model 135 may analyze the selected visual output using a vector analysis. The vector analysis may include generating, based on one or more characteristics of the selected visual output, at least one vector from the selected visual output. The at least one vector refers to an array of values (e.g., numbers) representative of the one or more characteristics identified from the selected visual output. The one or more characteristics of the selected visual output may include a pixel composition. The pixel composition may include, but is not limited to, an indication or representation of a placement of pixels in the selected image, a location of various pixels in the selected image, a number of pixels in the selected image, and so on.

The machine learning model 135 may determine the pixel composition based on one or more of color spaces, intensity levels, spatial arrangements, segmentations, contextual information, classifications, and so on. For example, the pixel composition may include a combination of intensity values in various color spaces (e.g., red, green, blue, etc.) that determine a pixel's color. The intensity levels refer to an intensity value associated with each individual pixel included in the pixel composition, a distribution of the intensity values contributing to a contrast and a brightness of the pixel composition. The spatial arrangement of each pixel included in the pixel composition reveals a structure (e.g., patterns, textures, shapes, etc.) of an image. Based on the values associated with each of the color spaces, intensity levels, and spatial arrangements, the machine learning model 135 may be further configured to perform segmentation within the pixel composition. The segmentation refers to a grouping together of individual pixels having similar characteristics (e.g., color spaces, intensity levels, special arrangements, etc.) to form regions or objects within the image. The machine learning model 135 may use contextual information of the pixel information in the selected image from the user device (e.g., characteristics of one or more neighboring pixels, one or more neighboring segmentations, etc.) to determine the pixel composition. In some embodiments, each segmentation may be classified based on the characteristics of the individual pixels included in the segmentation.

Thus, the pixel composition may represent or be indicative of one or more features of the selected visual output. For example, if the selected visual output includes an image of a pool having a waterslide with a hotel property in the background, the pixel composition may reveal a property with a pool. The presence of a waterslide may be used to determine, by the provider computing system 105, that the pool is family-friendly. Continuing with the example, the machine learning model 135 may identify a vector associated with the waterslide and a vector associated with a family-friendly pool, two features shown in the selected visual output. That is, the machine learning model 135 may, upon identifying a pool with a waterslide from the pixel composition, extract the two features of a waterslide and family-friendly pool. From these two features, the machine learning model 135 may further convert the features into vectors using the vector analysis, as described above.

After generating the at least one vector of the selected visual output, the machine learning model 135 may be configured to provide the at least one vector to a vector database (e.g., vector database 214, as described above with reference to FIG. 2). The vector database may include a library of vectors. The library of vectors refers to one of more vectors identified by the machine learning model 135 from other visual data (e.g., images associated with one or more travel experiences, travel properties, travel destinations, etc.) and that are subsequently stored in the vector database 214 for subsequent usage (e.g., retrieval for comparison purposes as described herein).

The method 400 may include act, operation, or process 430, which includes the provider computing system 105 identifying one or more second visual outputs. The "output" aspect in the second visual output refers to the providing of at least one second visual media item (e.g., photograph, audio item, video item, a combination thereof) for display (an output) on the user device 140 for observation by the user. The one or more second visual outputs may be stored in a database of the provider computing system 105. In some implementations, the provider computing system 105 may be configured to identify the one or more second visual outputs using a combination of the machine learning model 135 and/or various configurable parameters indicated by the user via the user device 140 in the search query, as described above. Therefore, the provider computing system 105 may be configured to determine the one or more second visual outputs based on the analysis of the selected visual output (e.g., during the act, operation, or process 425, as described above) and based on the various configurable parameters indicated by the user in the search query.

In some embodiments, the machine learning model 135 may identify the one or more second visual outputs based on the vector analysis performed during act, operation, or process 425, as described above. The machine learning model 135 may compare the at least one vector of the selected visual output to the library of vectors stored in the vector database (e.g., vector database 214) by determining a closeness between vectors. The machine learning model 135 determines the closeness between vectors by calculating a distance metric (e.g., a similarity metric, etc.) between the vectors. For example the machine learning model may use at least one of a Euclidean distance, a cosine similarity, a Manhattan distance, a Jaccard similarity, a Minkowski distance, and so on, to calculate the distance between vectors. In some embodiments, the machine learning model 135 may identify, for the at least one vector of the selected visual input, nearest neighbors based on the distance metric. In some embodiments, the user may define a parameter, k, to be used in the distance metric. That is, vectors within k distance of the at least one vector of the selected visual input may be identified as nearest neighbors. After identifying the nearest neighbors, the machine learning model 135 may determine that visual inputs associated with the identified nearest neighbors include the at least one feature of the selected visual output. That is, because each vector represents a particular feature based on the pixel composition of a visual input, as described above, the nearest neighbors are associated with a common feature. Visual inputs corresponding to the vectors identified as nearest neighbors each include the common feature and may be identified as one or more second visual outputs.

As an example, a user may select an image of a pool with a waterslide. The machine learning model 135 may, based on the pixel composition of the image, extract the feature of a family-friendly pool and associate the family-friendly pool feature with a vector. The machine learning model 135 may determine a distance between the vector and one or more other vectors stored in the library of vectors. Vectors within a distance parameter, k, of the vector associated with the family-friendly pool from the selected image may be identified as nearest neighbors and constitute a subset of the library of vectors associated with the family-friendly pool feature.

The machine learning model 135 may be further configured to identify a match value associated with the subset of the library of vectors. The match value associated with the subset of the library of vectors may be a metric (e.g., a percentage, a numerical value, a categorical value, a textual value, etc.) representing a similarity between the subset of the library of vectors and the at least one vector of the selected visual input. For example, a subset of the library of vectors including one or more vectors associated with a waterslide and one or more vectors associated with a family-friendly pool may be assigned a high match value (e.g., 100%, 10 points out of a 10-point scale, "Very good," "A," etc.) by the machine learning model 135 compared to a match value assigned to a subset of the library of vectors including either one or more vectors associated with the waterslide or one or more vectors associated with the family-friendly pool.

After the machine learning model 135 determines the subset of the library of vectors by comparing the at least one vector of the selected visual output to the library of vectors, the provider computing system 105 may identify the one or more second visual outputs. The provider computing system 105 may identify the one or more second visual outputs by identifying one or more visual outputs (e.g., images) associated with each of the vectors included in the matched identified subset of vectors. When identifying vectors from visual inputs (e.g., training inputs 202, actual output 210, etc.), the machine learning model may be configured to associate each of the vectors with the corresponding visual inputs stored in a database. Therefore, upon determining a subset of the library of the vectors, the provider computing system 105 may be configured to retrieve the corresponding visual inputs from the database, the corresponding visual inputs including the one or more second visual outputs.

As a specific example, after identifying a subset of the library of vectors that includes one or more vectors associated with a waterslide and one or more vectors associated with a family-friendly pool, the provider computing system 105 may retrieve, from a database of visual data (e.g., property images), one or more corresponding visual inputs associated with the one or more vectors associated with the waterslide and the one or more vectors associated with the family-friendly pool. Therefore, the one or more second visual outputs may include images that depict a family-friendly pool with a waterslide, which is consistent with the determined "like" of the user who selected the image that shows a pool with a waterslide based on the initial search query. The one or more second visual outputs may further include visual inputs corresponding to a subset of the library of vectors having a lower match value. For example, a subset of the library of vectors having a lower match value may correspond to visual inputs corresponding to one or more vectors associated with the pool, but not one or more vectors associated with the waterslide pool. In this case, the provider computing system 105 may retrieve, from the database of visual data, one or more corresponding visual inputs associated with the one or more vectors associated with the pool, but not with the one or more vectors associated with the family-friendly pool. Therefore, the one or more second visual outputs may further include property images that depict at least a pool, even if it is not identified as a pool with a waterslide and/or a family-friendly pool.

After identifying the one or more second visual outputs based on the analysis of the first visual output, the method 400 may include act, operation, or process 435, which includes generating a second array of visual outputs including the one or more second visual outputs identified by act, operation, or process 430. The second array of visual outputs may refer to a listing of visual data (e.g., images) corresponding to a plurality of recommended travel experiences based on the visual output received during act, operation, or process 420. The recommended travel experiences refer to one or more travel experiences stored in the provider institution system 105 with similar features and/or discerned intents as the features and/or discerned intents identified in the selected visual output from the first array of visual outputs. In some embodiments, the second array of visual outputs may include data (e.g., a property title, a location, a property rating, a price, an availability, etc.) associated with each of the one or more recommendations retrieved from an internal database.

In some embodiments, the provider computing system 105 may be configured to filter the one or more second visual outputs identified by act, operation, or process 430 according to a timeframe (e.g., a date range, a season, one or more months, etc.) from the user (e.g., received as an input from a user interface of the user device 140. The timeframe may be specified by the user in the first set of configurable parameters indicated when the user first initiates the search session by submitting an initial query. The provider computing system 105 may be configured to determine, from the internal database storing data associated with each of the one or more recommendations, whether each of the one or more second visual outputs corresponds to an availability during the timeframe from the user. The provider computing system 105 may be configured to include the one or more second visual outputs in the second array of visual outputs if there is an indication of an availability for the corresponding recommendation (e.g., travel property) during the timeframe received from the user. Alternatively or additionally, the provider computing system 105 may be configured to arrange the second array of visual outputs such that the one or more second visual outputs with the availability precede the one or more second visual outputs without the availability. For the one or more second visual outputs without the availability, the second array of visual outputs may include an indication of unavailability over the timeframe specified by the user.

The provider computing system 105 may be further configured to arrange the second array of visual outputs according to the match value determined by the machine learning model 135, as described above, such that recommendations corresponding to a subset of the library of vectors with a higher match value precede recommendations corresponding to a subset of the library of vectors with a lower match value. Continuing with the previous example of searching for a resort in Orlando, the provider computing system 105 may be configured to arrange the second array of visual outputs such that the one or more second visual outputs corresponding to vectors associated with the waterslide and to vectors associated with the family-friendly pool precede the one or more visual outputs corresponding to either vectors associated with the waterslide or to vectors associated with the family-friendly pool.

The method 400 may include act, operation, or process 440, wherein the provider computing system 105 provides the second array of visual outputs generated by process 435 to the user device 140. In some embodiments, the provider computing system 105 may provide the second array of visual inputs via a user interface of the user device. The method 400 may include act, operation, or process 445, wherein the user device 140 receives the second array of visual outputs. Upon receiving the second array of visual outputs, a user may be configured to compare each of the visual outputs included in the second array of visual outputs in order to identify which of the visual outputs best matches desired likes of a user. For example, if a first selected visual output (received by the provider computing system at process 420) depicts a kitchen of a certain style that the user particular likes, the second array of visual outputs may include images depicting kitchens of a same or a similar style, and the user can compare each of the images in the second array of visual inputs to identify an image that best fits the user's desires.

After the user identifies an image among the second array of visual outputs that best suits the user's desires, the user may click on the image and view additional information associated with a travel experience represented by the image. In some embodiments, upon clicking on the image, a user may be transferred to a third-party website (e.g., a website associated with third-party 170) on which the travel experience is available. For example, the user may be transferred to a third-party rental property service on which the travel experience (e.g., travel property) is listed. From the third-party website, the user may be configured to book the travel experience. In other embodiments, the user may be configured to book the travel experience from an interface generated by the provider computing system 105 and may not be required to book the travel experience from a third-party website. In this instance, the user may be configured to book the travel experience via the client application 145 on the user device 140.

As an example operation of method 400, a user may log into the client application 145 via a user device 140. Upon successfully accessing the client application 145, the user may initiate a search for a travel property by submitting a search query for resort properties in Orlando that accommodate four adults. The user may receive, via the user device 140, a gallery of images associated with a result that meets the criteria indicated in the search query (a resort in Orlando that accommodates four adults). Each image in the gallery of images may highlight a particular feature of the resort, and the user may select one image from the gallery of images that depicts a modern bar. Upon selecting the image depicting the modern bar, the user may engage with a selectable element enabling the user to view similar properties based on that image. The provider computing system 105 receives the selected image from the user device 140. From the selected image depicting the modern bar, the machine learning model 135 may identify one or more features of the selected image and determine a desire for a modern bar from the one or more identified features. After determining the desire for a modern bar, the machine learning model 135 may identify one or more images associated with one or more other properties that include a modern bar. From the one or more other properties that include a modern bar, the provider computing system 105 may be configured to identify resort properties in Orlando that accommodate four adults. The provider computing system 105 may be configured to generate a second array of visual outputs including the images associated with one or more resort properties in Orlando that accommodate four adults and that include a modern bar. The user device 140 may receive the second array of visual outputs and the user may view each of the one or more properties from the second array of visual outputs that also include a modern bar in order to identify a property that best matches the modern bar that the user desires.

Figure 5:
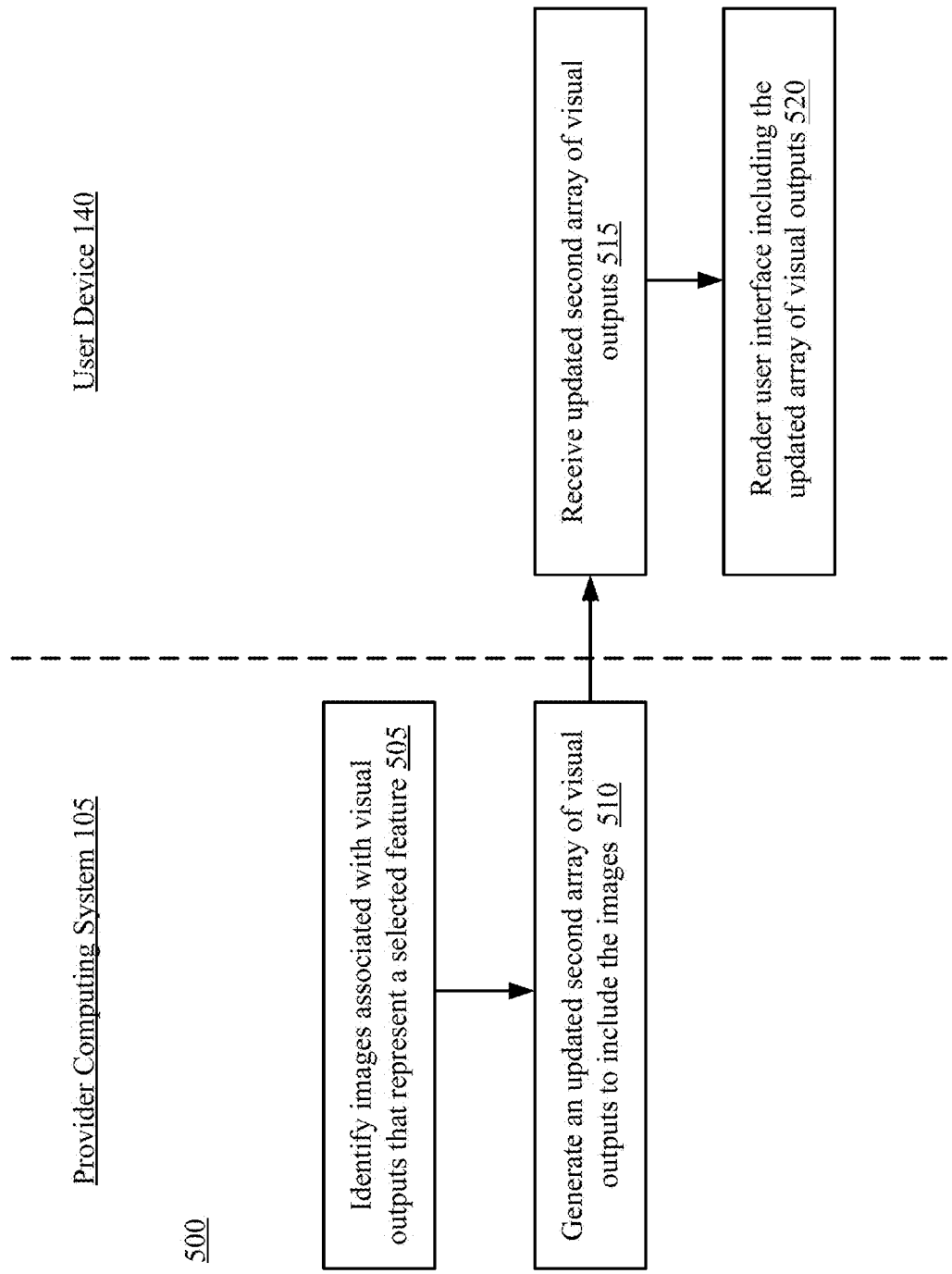
FIG. 5 depicts a method of generating and providing improved graphical user interfaces, according to an example embodiment.

Referring to FIG. 5, method 500 may be built upon method 400, as described above.

Method 500 refers to a process for generating and providing improved graphical user interfaces including the one or more travel experience recommendations as determined by method 400. In some embodiments, each of the one or more recommendations may include a default image associated with the recommendation (e.g., an image of a resort pool, an image of a hotel bar, an image of an ocean view, etc.). The default image may be one of a plurality of images associated with the recommendation. More specifically, the default image may be identified by an owner, manager, executive, or other personnel associated with the travel experience as representative of the travel experience. For example, the default image may include a building façade, a logo, one or more amenities, a scenic view, etc. The default image may be configured to display alongside other information associated with the travel experience. For example, the default image may be the image included on a homepage of a website for the travel experience, in a travel brochure, on a billboard, and so on. In some instances, the default image may be displayed alongside a title of the travel experience, a location, a price, one or more amenities offered, and any other information related to the travel experience. The default image is static, meaning in order to view additional images associated with the travel experience other than the default image, a user is required to click on the travel experience title to see other features included in one or more additional images associated with the travel experience. These additional clicks occupy network, increases bandwidth usages, consume the user's time, and presents additional burdens to the travel planning process. Further, the default image may depict features that are unappealing, irrelevant, etc. to the user, which requires a deeper investigation by the user regarding the property/experience associated with the default image. The deeper investigation may occupy bandwidth, lead to additional clicks, and ultimately take significant amounts of time.

Therefore, generating a second array of visual inputs may further include replacing the default image associated with each of the one or more recommendations with an image representing the at least one feature of and/or intent discerned from the selected visual output (e.g., the visual output received at act, operation, or process 420). Replacing the default image may be a non-conventional approach because it occupies additional processing power. Method 500 may include act, operation, or process 505 which includes identifying the image representing the at least one feature of and/or intent discerned from the selected visual output for each of the second visual outputs identified by the provider computing system 105 (e.g., process 430 of method 400). The image representing the at least one feature may be an image that the machine learning model 135 retrieves using the one or more vectors associated with the at least one feature of and/or intent discerned from the selected visual output. For example, if the at least one feature of the selected visual output include a waterslide and a family-friendly pool, the image representing that at least one feature for each of the one or more recommendations may be an image of a pool at each of the recommendations (e.g., properties).

The method 500 may include act, operation, or process 510 which includes the provider computing system 105 generating an updated second array of visual outputs to include the image representing the at least one feature for each of the second outputs included in the second array of visual outputs. That is, generating the updated second array of visual outputs includes replacing the default image associated with each of the recommendations corresponding to the one or more second visual outputs with the image representing the at least one feature such that the second array of visual outputs includes each image representing the at least one feature rather than the default image.

The method 500 may include act, operation, or process 515 which includes the user device 140 receiving the updated second array of visual outputs from the provider computing system 105 (e.g., over the network 101). The method 500 may include act, operation, or process 520 which includes the user device 140 rendering a user interface including the updated second array of visual outputs (e.g., user interface 600b and/or user interface 600d, described in further detail below with reference to FIGS. 6B and 6D, respectively).

By receiving the user interface including the second array of visual outputs via the user device 140, a user may compare how one or more results to the search query match one or more features desired by the user. The second array of visual outputs includes depictions of the desired features of that user in particular, thus presenting results catered to the individual user's preferences as indicated by the image selection from the user. Because the second array of visual outputs highlights the features of each of the travel experiences that are of most interest to the user, the user saves time and the system reduces bandwidth occupancy by not having to click through an image gallery associated with a search result in order to identify the desired features. Rather, the user can compare the desired features among each of the results from the user interface including the second array of visual outputs.

For example, two distinct users may initiate two separate search sessions. A first user may select a visual output including a modern bar, while a second user may select a visual output including a family-friendly pool. The second array of visual outputs presented to the first user may include visual outputs depicting a modern bar, while the second array of visual outputs presented to the second user may include visual outputs depicting a family-friendly pool. Although the visual outputs presented to the first user differ from the visual outputs presented to the second user, the visual outputs may be associated with a common travel experience (e.g., a same resort, a same hotel, a same rental property, etc.) presented to both the first user and the second user. The image associated with the common travel experience, however, differs between the first user and the second user because the second array of visual outputs presented to each user is personalized based on the features identified as most important to each.

In some embodiments, the second array of visual outputs includes a selectable element (e.g., a toggle button) configured to allow the user to navigate between a view of the default images and the images representing the at least one feature for each of the second outputs included in the second array of visual outputs.

As an example operation of method 500, and continuing with the example operation of method 400, as described above, the provider computing system 105 may identify images depicting the modern bar of each of the one or more travel properties that meet a user's initial search criteria and that include a modern bar. The provider computing system 105 may generate an updated second array of visual outputs that includes the images of the modern bar from each of the one or more travel properties. Therefore, the user device 140 receives the updated second array of visual outputs including images of the modern bar found at each of the travel properties, rather than a second array of visual outputs including default images associated with each of the travel properties. The user may receive a user interface including the images of each of the modern bars associated with the travel properties included in the second array of visual outputs such that the user can easily compare the modern bars at each of the travel properties from the user interface and determine which of the travel properties includes a modern bar with a closest match to the user's preferences.

Figure 6B:
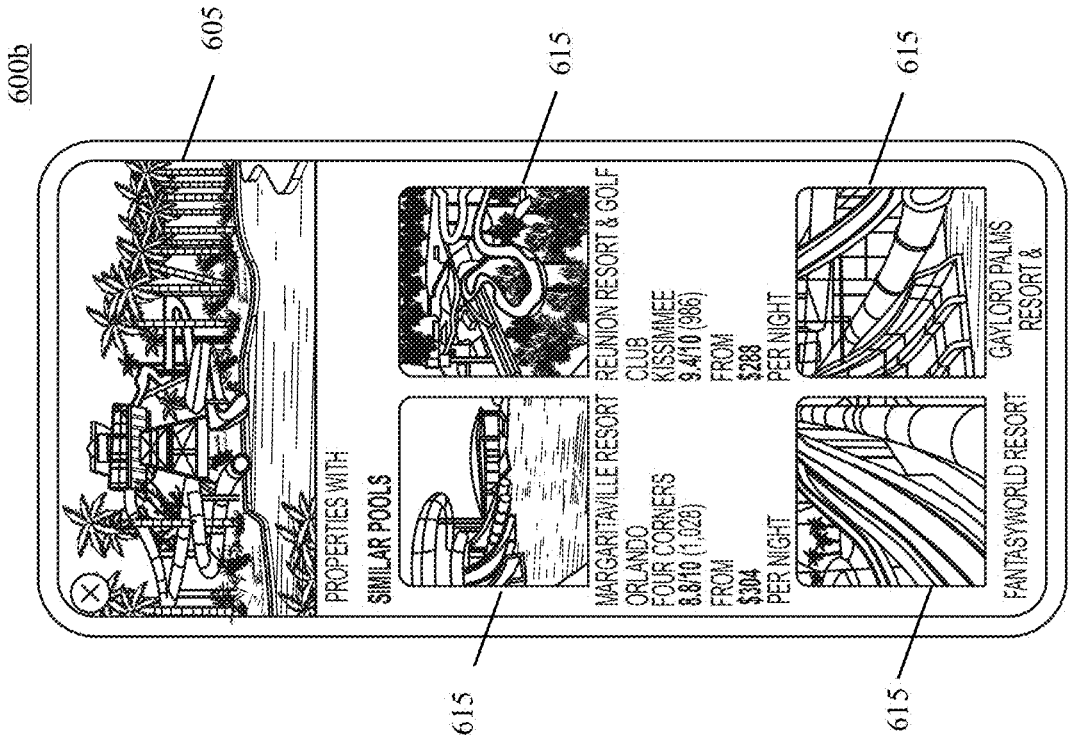
FIGS. 6A-6D depict user interfaces provided to a user to receive at least one image-based recommendation, according to one or more example embodiments.
Figure 6A:
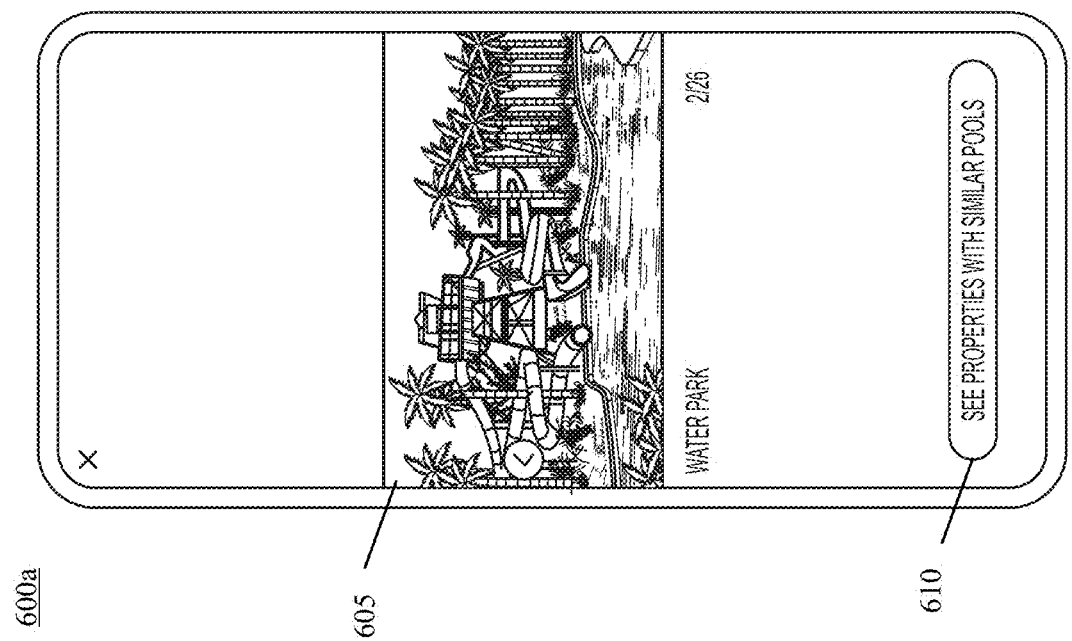

Referring now to FIG. 6A, the user device 140 (e.g., the client application 145) or the provider computing system 105 may be configured to generate a user interface 600a to be displayed on the user device 140, as depicted in FIG. 6A. In some embodiments, FIG. 6A includes a selected visual output 605 from a first array of visual outputs (602, as described below with reference to FIG. 6C). The first array of visual outputs may include the first array of visual outputs received by user device 140 at process 410 of method 400. The selected visual output 605 may include the first visual output provided by the user device 140 at process 415 and received by the provider computing system 105 at process 420. For example, the selected visual output 605 shown on user interface 600a may include an image of a pool with a waterslide. The image of the pool with the waterslide may be one image out of a gallery of images associated with a travel experience (e.g., a resort) resulting from an initial query from a user to begin a search session. From the selected visual output 605, the user interface 600a may present the user with an option to view similar visual outputs, as described herein. As shown in FIG. 6A, the option to view similar visual outputs may include a selectable element 610 on the interface. The selectable element 610 may, for example, include a button, field, hyperlinked text, and so on. As shown in FIG. 6A, the selectable element 610 may include the hyperlinked text "See properties with similar pools."

Referring to FIG. 6B, the user device 140 (e.g., the client application 145) or the provider computing system 105 may be configured to generate a user interface 600b to be displayed on the user device 140, as depicted in FIG. 6B. In some embodiments, FIG. 6B includes a second array of visual outputs 615 generated by the provider computing system 105, as described herein. The second array of visual outputs 615 may include the second array of visual outputs generated at process 435 of method 400. The user device 140 may generate user interface 600b upon receiving an indication that a user has interacted with the selectable element 610 of user interface 600a. The second array of visual outputs 615 may include the one or more second visual outputs determined by the machine learning model 135 in response to receiving a selected visual output with at least one feature and/or discerned intent, as described above with respect to process 430 of method 400. The second array of visual outputs 615 may include one or more images depicting a same feature and/or discerned intent as the at least one feature and/or discerned intent included in the selected visual output. User interface 600b may include one or more second visual outputs relating to recommendations determined by the provider computing system 105. The second array of visual outputs 615 may include additional information relating to each of the recommendations (e.g., a property name, a location, a rating, a price, an availability, etc.). In some embodiments, as described herein, the second array of visual outputs 615 as depicted on user interface 600b may be arranged according to the match value determined by the machine learning model 135.

In some embodiments, upon receiving the second array of visual outputs 615 on interface 600b, the user interface 600b may present an option for the user to apply a second set of configurable parameters to the results included in the second array of visual outputs. In some embodiments, applying the second set of configurable parameters may include updating one or more parameters (e.g., a party size, a geographical region, a property-type, a timeframe, a price range, one or more amenity offerings, etc.) from the first set of configurable parameters indicated by the initial query from the user. For example, the user may, using the second set of configurable parameters, expand the geographic area associated with the recommendations included in the second array of visual outputs 615. If a user's initial query specifies resorts in Orlando, the user may update the geographic area by applying a second set of configurable parameters to expand the geographic area such that the recommendations included in the second array of visual outputs 615 includes resorts in any part of Florida. By offering a geo-expansion feature using the second set of configurable parameters, a user can more efficiently search for travel experiences based on image-similarity, rather than exclusively on user-specified parameters.

Figure 6D:
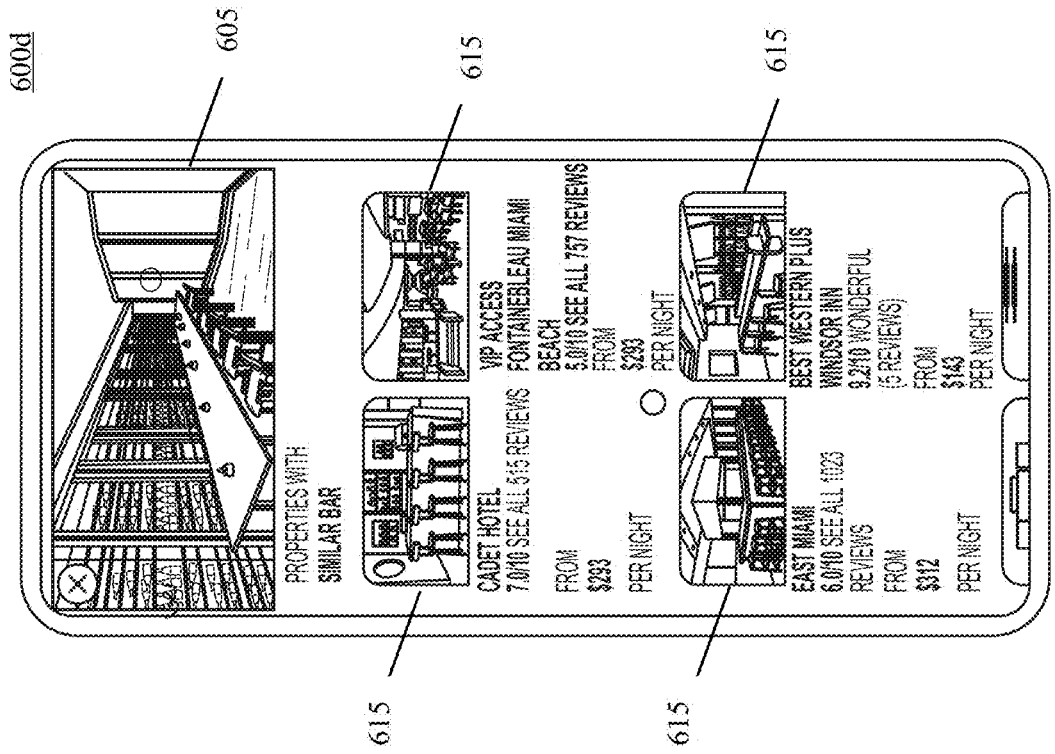
Figure 6C:
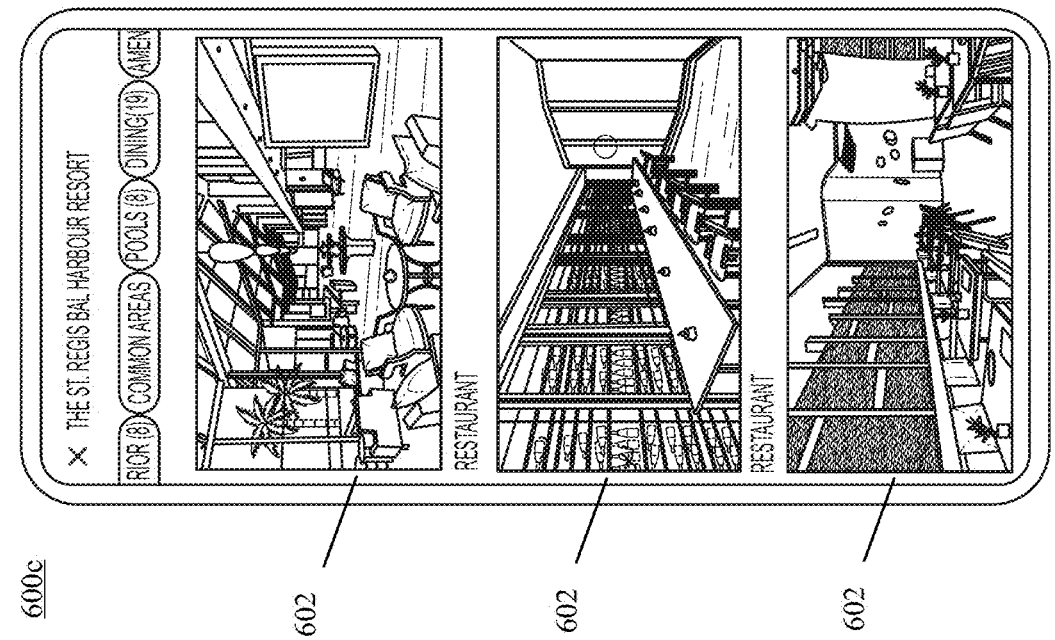

Referring to FIG. 6C, the user device 140 (e.g., the client application 145) or the provider computing system 105 may be configured to generate a user interface 600c to be displayed on the user device 140, as depicted in FIG. 6C. In some embodiments, FIG. 6C includes a first array of visual outputs 602. The first array of visual outputs 602 may include the first array of visual outputs received by the user device 140 during process 410 of method 400. For example, the first array of visual outputs 602 may include a set of images depicting one or more dining options available at a travel property. A user may select an image of the first array of visual outputs 602, and from that selected visual output, the user can choose to view similar visual outputs, as described above with reference to FIG. 6A. The selected visual output may include the first visual output provided by the user device 140 during process 415 and received by the provider computing system during process 420 of method 400. For example, if the user selects an image of a dining options with outdoor seating and an ocean-front view, the user may choose to view additional properties with dining options including outdoor seating and/or an ocean-front view based on the vector analysis performed by the machine learning model 135, as described herein.

Referring to FIG. 6D, the user device 140 (e.g., the client application 145) or the provider computing system 105 may be configured to generate a user interface 600d to be displayed on the user device 140, as depicted in FIG. 6D. In some embodiments, FIG. 6D includes another depiction of a second array of visual outputs 615 generated by the provider computing system 105. The second array of visual outputs 615 may include the second array of visual outputs generated during process 435 of method 400. User interface 600d may include the same or similar features as user interface 600b, as described above with reference to FIG. 6B. For example, after the user chooses to view additional properties with dining options similar to one of the images (e.g., selected visual input 605) presented on user interface 600c, the user device 140 may generate user interface 600d to present the second array of visual outputs 615 including one or more dining options that include at least one feature identified in and/or intent discerned the selected visual output 605 chosen from user interface 600c.

From the user interface 600d, a user may select one of the one or more dining options among the second array of visual outputs 615 that matches the user's preferences. After selecting one of the one or more dining options, the user may be transferred to a third-party rental property service on which the travel property is listed. From the third-party website, the user may be configured to book a stay at the travel property associated with the selected dining option. In other embodiments, the user may be configured to book the travel experience from an interface generated by the provider computing system 105 and may not be required to book the travel experience from a third-party website. In this instance, the user may be configured to book the travel experience via the client application 145 on the user device 140.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings.

The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation.

Conversely, various features that are described in the context of a single implementation may also be implemented in multiple implementations separately or in any suitable subcombination.

Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous.

Moreover, the separation of various system components in the implementations described above should not be understood as requiring such separation in all implementations, and it should be understood that the described program components and systems may generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A computing system, comprising:
   a network interface configured to communicate with a user device associated with a suer; and
   at least one processing circuit coupled to the network interface, the at least one processing circuit comprising at least one processor and at least one memory, the at least one memory storing instructions therein that, when executed by the at least one processor, cause the at least one processor to:
   receive, as part of a search session, a search query comprising a first set of configurable parameters defined by the user;
   provide, as part of the search session, a first array of visual outputs that meet one or more criteria defined by the first set of configurable parameters;
   receive, from the user device and during the search session, a selection of a first visual output from the first array of visual outputs, the first array of visual outputs comprising a first set of configurable parameters defined by a user;
   extract, using a machine learning model and using a pixel composition of the first visual output, at least one feature of the first visual output based on a characteristic of the first visual output:
   identify, using the machine learning model, one or more second visual outputs from a plurality of visual outputs stored in a database that share the at least one feature of the first visual output based on a characteristic of each of the one or more second visual outputs;
   generate a second array of visual outputs comprising the one or more second visual outputs related to a plurality of travel properties;
   wherein each of the plurality of travel properties comprises a default image;
   replace the default image for each of the plurality of travel properties with an image representing the at least one feature of the first visual output;

wherein the second array of visual outputs comprises the replaced default image representing the at least one feature of the first visual output for each of the plurality of travel properties;

wherein the second array of visual outputs comprises at least one of the first set of configurable parameters or a second set of configurable parameters defined by the user; and display, via a user interface of the user device and during the search session, the second array of visual outputs.

2. The computing system of claim 1, wherein the instructions, when executed by the at least one processor, further cause the at least one processor to:

generate, using the machine learning model, at least one vector of the first visual output based on the characteristic of the first visual output, the at least one vector being associated with the at least one feature;

provide the at least one vector to a vector database, the vector database comprising a library of vectors;

compare the at least one vector to the library of vectors;

determine a subset of the library of vectors having a match value corresponding to the at least one vector based on the comparison of the at least one vector to the library of vectors; and identify the one or more second visual outputs from the plurality of visual outputs stored in the database based on the one or more second visual outputs corresponding to the subset of the library of vectors.

3. The computing system of claim 2, wherein the instructions, when executed by the at least one processor, further cause the at least one processor to:

arrange the second array of visual outputs according to the match value of the subset of the library of vectors.

4. The computing system of claim 1, wherein the instructions, when executed by the at least one processor, further cause the at least one processor to:

receive a timeframe from the user;

determine an availability of each of the plurality of travel properties during the timeframe; and display available travel properties in the second array of visual outputs.

5. The computing system of claim 1, wherein the instructions, when executed by the at least one processor, further cause the at least one processor to:

train the machine learning model using predetermined training data;

wherein the predetermined training data includes one or more of image data, caption data, travel metadata, or user account data.

6. The computing system of claim 1, wherein the first array of visual outputs comprises an array of images corresponding to a travel experience.

7. The computing system of claim 1, wherein the first set of configurable parameters and the second set of configurable parameters comprise at least one of a party size, a geographical region, a property-type, a timeframe, a price range, or one or more amenity offerings.

8. A computer-implemented method, comprising:

receiving, by a computing system and as part of a search session, a search query comprising a first set of configurable parameters defined by a user;

providing, by the computing system and as part of the search session, a first array of visual outputs that meet one or more criteria defined by the first set of configurable parameters;

receiving, by the computing system from a user device associated with the user and communicably coupled to the computing system, during the search session, a selection of a first visual output from the first array of visual outputs;

extracting, by the computing system using a machine learning model stored in the computing system and using a pixel composition of the first visual output, at least one feature of the first visual output based on a characteristic of the first visual output;

identifying, by the computing system using the machine learning model, one or more second visual outputs from a plurality of visual outputs stored in a database that share the at least one feature of the first visual output based on a characteristic of each of the one or more second visual outputs;

generating, by the computing system, a second array of visual outputs related to a plurality of travel properties comprising the one or more second visual outputs;

wherein each of the plurality of travel properties comprises a default image;

replace the default image for each of the plurality of travel properties with an image representing the at least one feature of the first visual output;

wherein the second array of visual outputs comprises the replaced default image representing the at least one feature of the first visual output for each of the plurality of travel properties;

wherein the second array of visual outputs comprises at least one of the first set of configurable parameters or a second set of configurable parameters defined by the user; and displaying, by the computing system via a user interface of the user device and during the search session, the second array of visual outputs.

9. The method of claim 8, further comprising:

receiving, by the computing system, a timeframe from the user;

determining, by the computing system, an availability of each of the plurality of travel properties during the timeframe; and displaying, by the computing system, available travel properties in the second array of visual outputs.

10. The method of claim 8, further comprising:

training, by the computing system, the machine learning model using predetermined training data;

wherein the predetermined training data includes one or more of image data, caption data, travel metadata, or user account data.

11. The method of claim 8, further comprising:

generating, by the computing system using the machine learning model, at least one vector of the first visual output based on the characteristic of the first visual output, the at least one vector being associated with the at least one feature;

providing, by the computing system using the machine learning model, the at least one vector to a vector database, the vector database comprising a library of vectors;

comparing, by the computing system using the machine learning model, the at least one vector to the library of vectors;

determining, by the computing system using the machine learning model, a subset of the library of vectors having a match value corresponding to the at least one vector based on the comparison of the at least one vector to the library of vectors; and identifying, by the computing system using the machine learning model, the one or more second visual outputs from the plurality of visual outputs stored in the database based on the one or more second visual outputs corresponding to the subset of the library of vectors.

12. The method of claim 11, further comprising:
arranging, by the computing system, the second array of visual outputs according to the match value of the subset of the library of vectors.

13. The method of claim 8, wherein the first array of visual outputs comprises an array of images corresponding to a travel experience.

14. The method of claim 8, wherein the first set of configurable parameters and the second set of configurable parameters comprise at least one of a party size, a geographical region, a property-type, a timeframe, a price range, or one or more amenity offerings.

15. A non-transitory computer-readable medium having computer-executable instructions embodied therein that, when executed by at least one processor of a provider computing system, cause the provider computing system to perform operations comprising:
receiving, as part of a search session, a search query comprising a first set of configurable parameters defined by a user;
providing, as part of the search session, a first array of visual outputs that meet one or more criteria defined by the first set of configurable parameters;
receiving, from a user device associated with the user and during the search session, a selection of a first visual output from the first array of visual outputs;
extracting, using a machine learning model and using a pixel composition of the first visual output, at least one feature of the first visual output based on a characteristic of the first visual output;
identifying, using the machine learning model, one or more second visual outputs from a plurality of visual outputs stored in a database that share the at least one feature of the first visual output based on a characteristic of each of the one or more second visual outputs;
generating a second array of visual outputs related to a plurality of travel properties comprising the one or more second visual outputs;
wherein each of the plurality of travel properties comprises a default image;
replace the default image for each of the plurality of travel properties with an image representing the at least one feature of the first visual output;
wherein the second array of visual outputs comprises the replaced default image representing the at least one feature of the first visual output for each of the plurality of travel properties;
wherein the second array of visual outputs comprises at least one of the first set of configurable parameters or a second set of configurable parameters defined by the user; and
displaying, via a user interface of the user device and during the search session, the second array of visual outputs.

16. The non-transitory computer-readable medium of claim 15, wherein the operations further comprise:
generating, using the machine learning model, at least one vector of the first visual output based on the characteristic of the first visual output, the at least one vector being associated with the at least one feature;
providing the at least one vector to a vector database, the vector database comprising a library of vectors;
comparing the at least one vector to the library of vectors;
determining a subset of the library of vectors having a match value corresponding to the at least one vector based on the comparison of the at least one vector to the library of vectors; and
identifying the one or more second visual outputs from the plurality of visual outputs stored in the database based on the one or more second visual outputs corresponding to the subset of the library of vectors.

* * * * *